(12) United States Patent
Dubin

(10) Patent No.: US 12,380,210 B2
(45) Date of Patent: Aug. 5, 2025

(54) ANALYZING FILES USING A KERNEL MODE OF A VIRTUAL MACHINE

(71) Applicant: OPSWAT Inc., Tampa, FL (US)

(72) Inventor: Ran Dubin, Habostan 2 (IL)

(73) Assignee: OPSWAT Inc., Tampa, FL (US)

( * ) Notice: Subject to any disclaimer, the term of this patent is extended or adjusted under 35 U.S.C. 154(b) by 303 days.

(21) Appl. No.: 17/805,677

(22) Filed: Jun. 6, 2022

(65) Prior Publication Data

US 2023/0394146 A1      Dec. 7, 2023

(51) Int. Cl.
*G06F 21/56*     (2013.01)
*G06F 9/455*     (2018.01)
*G06F 21/53*     (2013.01)

(52) U.S. Cl.
CPC ........ *G06F 21/565* (2013.01); *G06F 9/45558* (2013.01); *G06F 21/53* (2013.01); *G06F 2221/034* (2013.01)

(58) Field of Classification Search
CPC .... G06F 21/565; G06F 9/45558; G06F 21/53; G06F 2009/45595; G06F 2221/034; G06F 2009/45587
See application file for complete search history.

(56) References Cited

U.S. PATENT DOCUMENTS

| | | | |
|---|---|---|---|
| 8,272,048 B2* | 9/2012 | Cooper | G06F 21/6281 726/17 |
| 9,148,428 B1 | 9/2015 | Banga et al. | |
| 9,208,328 B2* | 12/2015 | Russello | G06F 21/53 |
| 10,033,747 B1* | 7/2018 | Paithane | G06F 21/566 |
| 10,341,363 B1 | 7/2019 | Vincent et al. | |
| 2015/0096022 A1* | 4/2015 | Vincent | G06F 21/562 726/23 |
| 2016/0306966 A1* | 10/2016 | Srivastava | H04L 9/30 |
| 2017/0032123 A1* | 2/2017 | Carson | G06F 21/52 |
| 2019/0205533 A1* | 7/2019 | Diehl | G06F 21/53 |
| 2019/0222591 A1 | 7/2019 | Kislitsin et al. | |
| 2020/0242236 A1 | 7/2020 | Ghosh et al. | |
| 2021/0026950 A1* | 1/2021 | Ionescu | G06F 9/30101 |
| 2021/0182388 A1* | 6/2021 | Myneni | G06F 21/568 |
| 2021/0192043 A1 | 6/2021 | Bhary et al. | |
| 2022/0066808 A1* | 3/2022 | Tsirkin | H04L 63/0263 |

OTHER PUBLICATIONS

"Combating Malware Innovation With Innovation", Sndbox Technology Ltd 2018, 3 pgs, www.sndbox.com.
Kumar, Mohit., "SNDBOX: AI-Powered Online Automated Malware Analysis Platform", Dec. 5, 2018, 12 pgs, The Hacker News. https://thehackernews.com/2018/12/sndbox-malware-analysis-tool.html.

* cited by examiner

*Primary Examiner* — Patrice L Winder
(74) *Attorney, Agent, or Firm* — MLO, a professional corp.

(57) ABSTRACT

A method includes receiving, by a computerized system, a file in network traffic to an enterprise system. The computerized system identifies data associated with the file. The computerized system receives a policy based on the data associated with the file for an event of the file. The computerized system executes the file in a user mode of a virtual machine. A driver in a kernel mode of the virtual machine analyzes the event of the file based on the policy during the executing of the file. When the event violates the policy, the computerized system denies an entry of the file to the enterprise system.

20 Claims, 8 Drawing Sheets

FIG. 4 – Prior Art

ANALYZING FILES USING A KERNEL MODE OF A VIRTUAL MACHINE

BACKGROUND

Malware is software designed to cause disruption to a computer, server, client, or computer network, leak private information, gain unauthorized access to information or systems, deprive users access to information or which unknowingly interferes with the user's computer security and privacy. Malware includes, for example, computer viruses, ransomware, worms, Trojan horses, rootkits, key loggers, dialers, adware, rogue software, wiper, scareware and other malicious programs. A sandbox or virtual machine is used to run software or executable files in a safe, isolated space from the environment such as a network or enterprise system. Executing software or files in these isolated environments separate the resulting activity of the software or files from an actual production environment so that any potential issues cannot negatively influence or impact the underlying system.

There is a need for a zero-trust protection security measure when managing untrusted files to safeguard environments against malware, suspicious files or unwanted activity by files.

SUMMARY

Some embodiments involve a method of receiving, by a computerized system, a file in network traffic to an enterprise system. The computerized system identifies data associated with the file. The computerized system receives a policy based on the data associated with the file for an event of the file. The computerized system executes the file in a user mode of a virtual machine. A driver in a kernel mode of the virtual machine analyzes the event of the file based on the policy during the executing of the file. When the event violates the policy, the computerized system denies an entry of the file to the enterprise system.

Some embodiments involve a computerized system which includes a memory storing executable instructions and a processor, coupled to the memory, that performs a method by executing the instructions stored in the memory. The method includes receiving, by the processor, a file in network traffic to an enterprise system. The processor identifies data associated with the file. The processor receives a policy based on the data associated with the file for an event of the file. The processor executes the file in a user mode of a virtual machine. A driver in a kernel mode of the virtual machine analyzes the event of the file based on the policy during the executing of the file. When the event violates the policy, the processor denies an entry of the file to the enterprise system.

Some embodiments involve a non-transitory computer-readable media embodying program instructions that, when executed by a processor, cause the processor to implement a method. The method includes receiving a file in network traffic to an enterprise system and identifying data associated with the file. A policy is received based on the data associated with the file for an event of the file. The file is executed in a user mode of a virtual machine. A driver in a kernel mode of the virtual machine analyzes the event of the file based on the policy during the executing of the file. When the event violates the policy, denying an entry of the file to the enterprise system.

DETAILED DESCRIPTION

Figure 1:
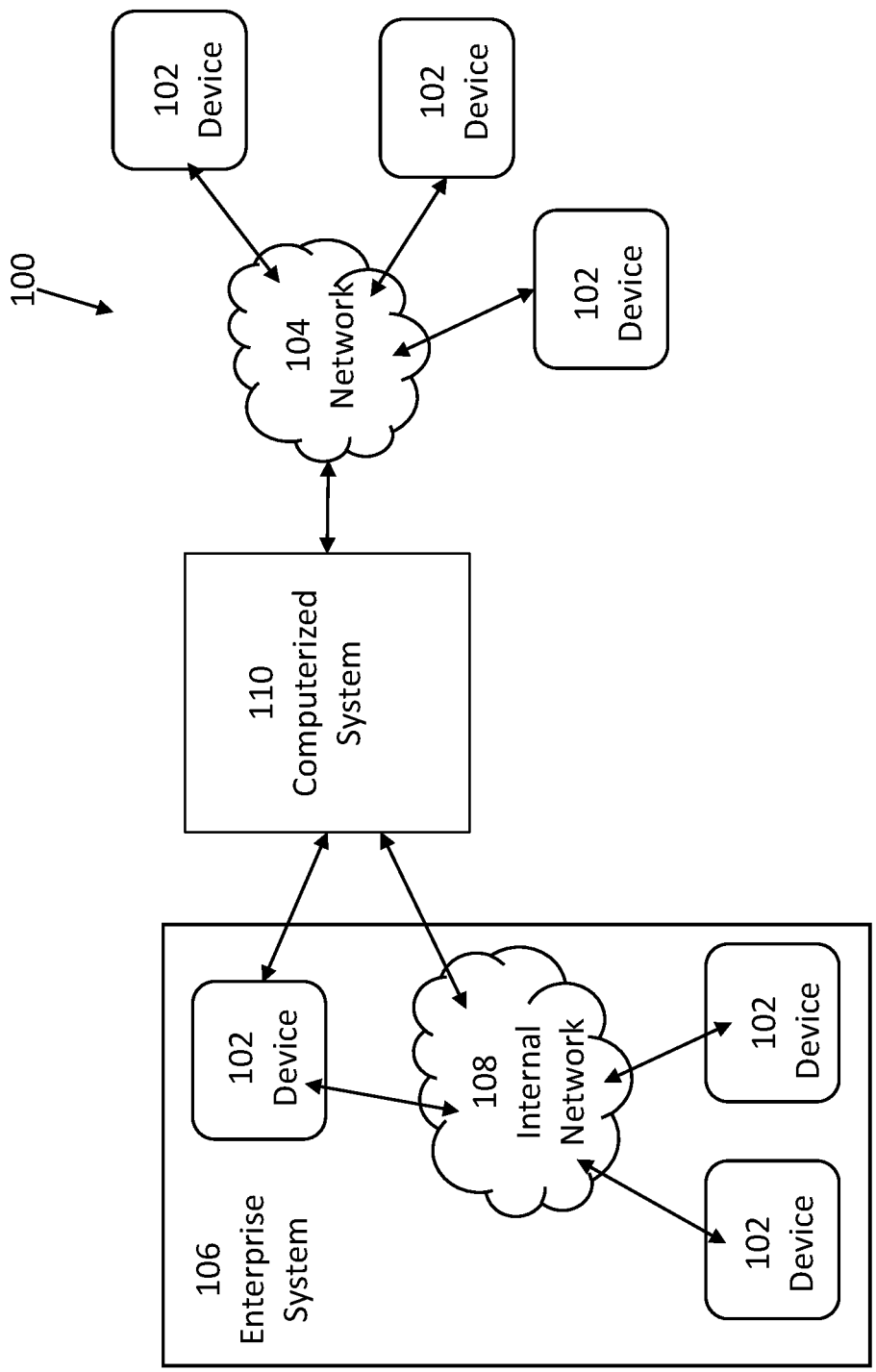
FIG. 1 is a schematic of an example communication system, in accordance with some embodiments.

The present disclosure relates to methods and systems for managing untrusted files to determine whether to allow the files to enter an enterprise system as a security measure. Files are received from network traffic and analyzed using a virtual machine of the malware sandbox. The malware sandbox containing a plurality of virtual machines, is a safe, isolated space from the environment where untrusted files can be executed and the resulting behavior (also referred to as events or activities) can be monitored and tracked in the kernel mode of the virtual machine. A policy is applied in the kernel mode to the resulting activities determining if the file is denied or allowed to enter the enterprise system. In this way, the detection and analyzing is performed in the kernel mode rather than in a user mode.

The method and system can stop malware or any unwanted file quickly without relying on Artificial Intelligence (AI), machine learning, signatures or others. Those known methods have drawbacks because they mainly detect known threats that have already been discovered. In contrast, the embodiments in the present application use a zero-trust concept policy so that any behavior outside of the policy can be stopped and blocked from the environment. The behavior may not be malware or a threat, and instead, may be a legitimate event but according to the policy, an unwanted event. The policy is customizable by the organization and based on what legitimate activities of the file the organization wants to approve or allow into its enterprise system and hence, in the user operating system. At the same time, threats such as infections or malware may be found, and the file is denied entry to the enterprise system. For example, a file from the network traffic may be a Word document which is executed in the virtual machine of the malware sandbox. The kernel mode may detect that the Word document opens a powershell. This is not necessarily a malicious activity but there is no reason for a Word document to open a powershell. In this case, the file would not be permitted to enter the enterprise system.

The present embodiments provide more than a detection method for malware, threats, infections or anomalies. The policy may be based on a profile of an organization, file type, file research, or government regulations. By customizing the policy, the policy determines what resulting activities or events depending on the type of file are permitted for that organization. This limits what files are permitted in the enterprise system, reducing a wider range of attacks, and reducing risk to the organization.

Conventionally, using virtual machines in malware sandboxes for malware threat detection on files involves utilizing a user mode and kernel mode. This can lead to failures since it is easy to detect user mode sandbox activity by malware. Detection methods using the user mode/kernel mode is a slow process and time-consuming process because aggressive monitoring of the file activity creates hundreds of MB log behavior that needs to be analyzed, processed and have attack insights extracted. The known-in-the-art for user mode/kernel mode monitoring process consists of collecting the data in the kernel mode then uploading it to a user application in the user mode. There is a lot of raw data to process and upload from the kernel mode to the user mode, and this large amount of raw data needs to be analyzed. The raw data contains many Input/Output (I/O) operations that slows down the system performance and increase the analysis duration which is an expensive and time-consuming task performed per file. The process of collecting, uploading, analyzing, processing, and extracting attack insights may take three to 10 minutes per file.

In contrast, the methods and systems disclosed herein, monitor, track, apply the policy and detect in the kernel mode quickly, such as in 30 to 60 seconds per file. This is feasible because the application control is in the kernel mode, so data stays in the kernel mode instead of needing to be transferred to the user mode for further post analysis. This enables the quick detection time, reduces resources, and reduces overall cost. Also, if any activity violation such as an unwanted activity or malware is detected in the kernel mode, the violation is recorded and the dynamic run via the virtual machine is stopped further saving cost.

FIG. 1 is a schematic of an example communication system 100, in accordance with some embodiments. Users communicate with each other using a variety of communication devices 102, such as personal computers, laptop computers, tablets, mobile phones, landline phones, smartwatches, smart cars, or the like, operated by a user. The devices 102 generally transmit and receive network traffic communications such as files, data, and emails, through a variety of paths, communication access systems or networks 104. The networks 104 may be the Internet, a variety of carriers for telephone services, third-party communication service systems, third-party application cloud systems, third-party customer cloud systems, cloud-based broker service systems (e.g., to facilitate integration of different communication services), on-premises enterprise systems, or other potential systems. In some embodiments, the communication system 100 includes an on-premises enterprise system 106 which may be a computer, a group of computers, a server, a server farm, or a cloud computing system.

The enterprise system 106 may include an internal network 108 through which internal communication devices 102 communicate. A computerized system 110 may be part of the enterprise system 106 or outside of the enterprise system 106, and receives all network traffic communication, such as data or files transmitted to or within the enterprise system 106. In some embodiments, the computerized system 110 receives the files through the network 104, the internal networks 108 or directly from some of the devices 102. The files may be common document types, image files, emails, etc. In this way, the incoming files can be evaluated using security measures, thus protecting the enterprise system 106 and devices 102 from known or unknown threats. The incoming files can be analyzed by the computerized system 110 and may be returned to the network 104, the internal networks 108 or directly to the devices 102 for entry into the enterprise system 106 or a network system. In some embodiments, the computerized system 110 (or a part thereof) is part of the on-premises enterprise system 106 or a regional communication system and may be associated with one or a plurality of such enterprise systems 106, entities or business organizations.

In accordance with the description herein, the various illustrated components of the communication system 100 generally represent appropriate hardware and software components for providing the described resources and performing the described functions. The hardware generally includes any appropriate number and combination of computing devices, network communication devices, and peripheral components connected, including various processors, computer memory (including transitory and non-transitory media), input/output devices, user interface devices, communication adapters, communication channels, etc. The software generally includes any appropriate number and combination of conventional and specially developed software with computer-readable instructions stored by the computer memory in non-transitory computer-readable or machine-readable media and executed by the various processors to perform the functions described herein.

Figure 2:
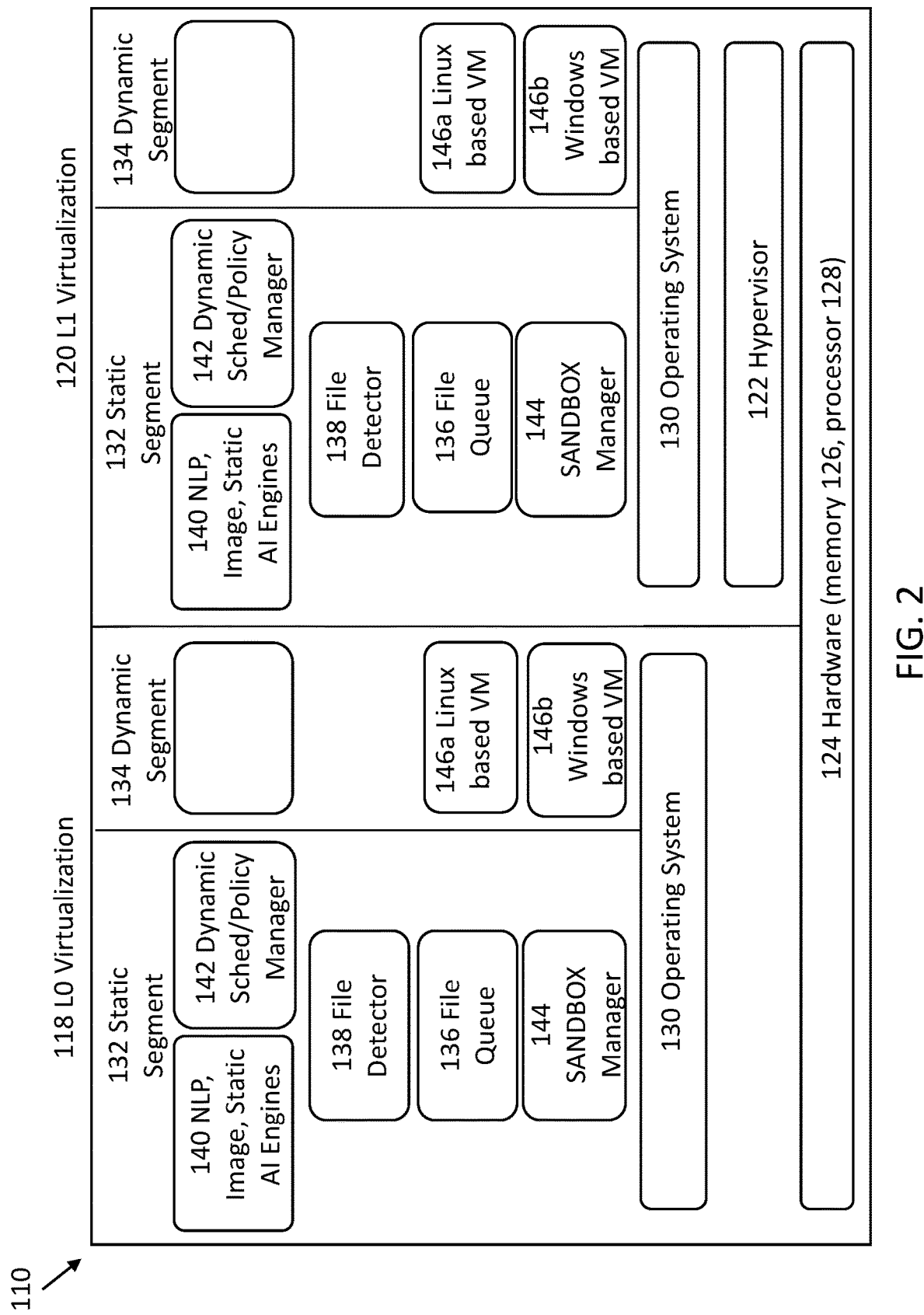
FIG. 2 is a schematic of a computerized system, in accordance with some embodiments.

FIG. 2 is a schematic of the computerized system 110, in accordance with some embodiments. The computerized system 110 may be implemented in different infrastructures. For example, computerized system 110 may be implemented as L0 Virtualization 118 such as cloud-based, in a layer over hardware 124, or bare metal cloud. Alternatively, the computerized system 110 may be implemented as L1 Virtualization 120, in a layer above a hypervisor 122. In these implementations, the communication system 100 includes traditional hardware 124 such as a memory 126 storing executable instructions, and a processor 128 coupled to the memory 126. An operating system 130 manages the resources and is an interface between software and hardware. There may be a static segment 132 and a dynamic segment 134, each having a plurality of modules. For example, the static segment 132 may include a file queue module 136, file detector module 138, NLP, image, static AI engine module 140, dynamic scheduler policy manager module 142 and sandbox manager module 144. The dynamic segment 134 may include a virtual machine 146 such as a Linux-based virtual machine 146a or a Windows-based virtual machine 146b. The virtual machine 146 can run different operating systems such as Windows 7, Windows 10, Windows 11, Linux distribution and the like. The sandbox manager module 144 in conjunction with the dynamic scheduler policy manager module 142, may decide which virtual machine 146 will be used and may depend on the file type or user/system decision. The sandbox manager module 144 has the ability to schedule and run the file in one or more virtual machines 146 singularly, in combination or simultaneously.

Figure 3:
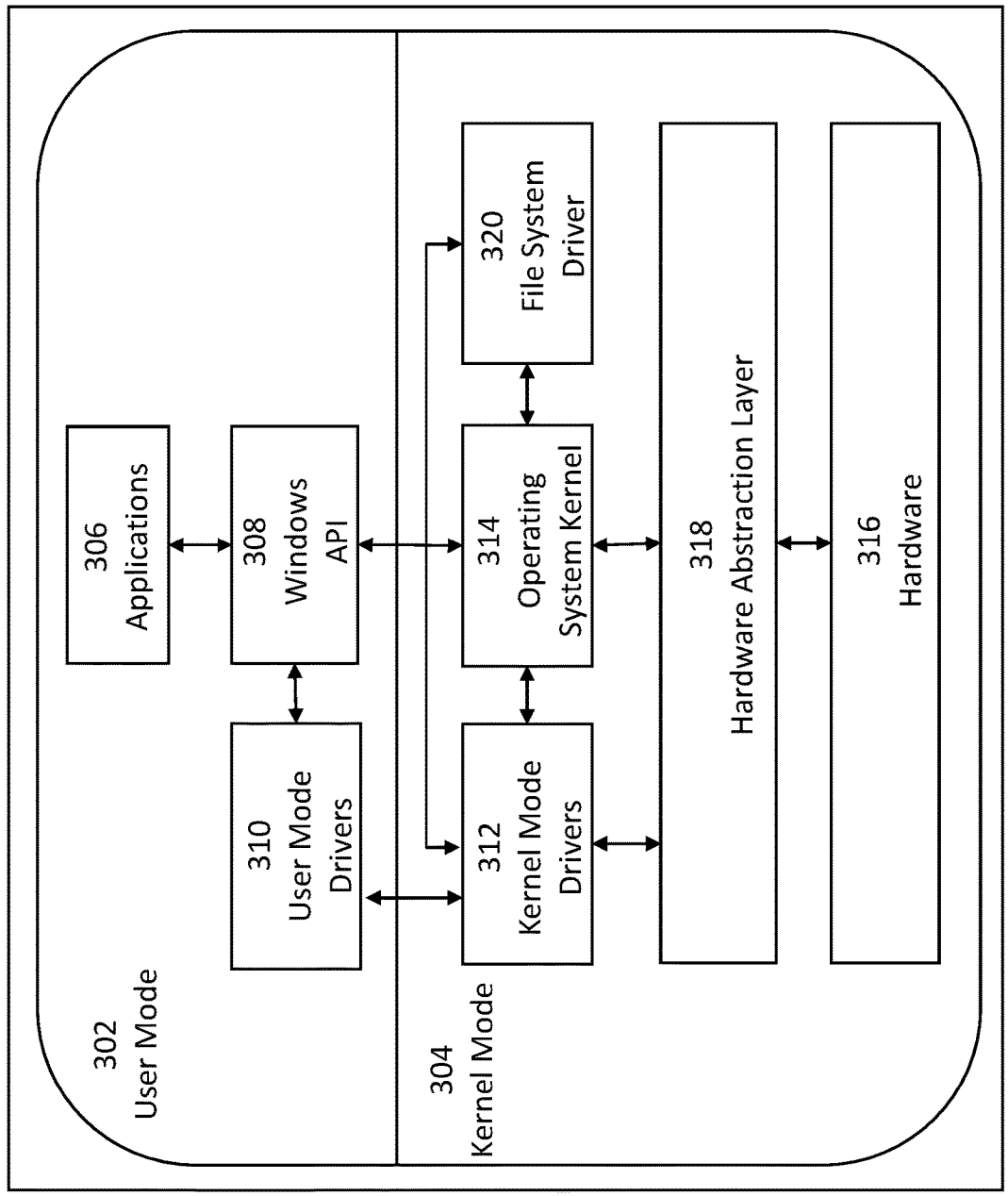
FIG. 3 is a schematic of a virtual machine, in accordance with some embodiments.
Figure 5:
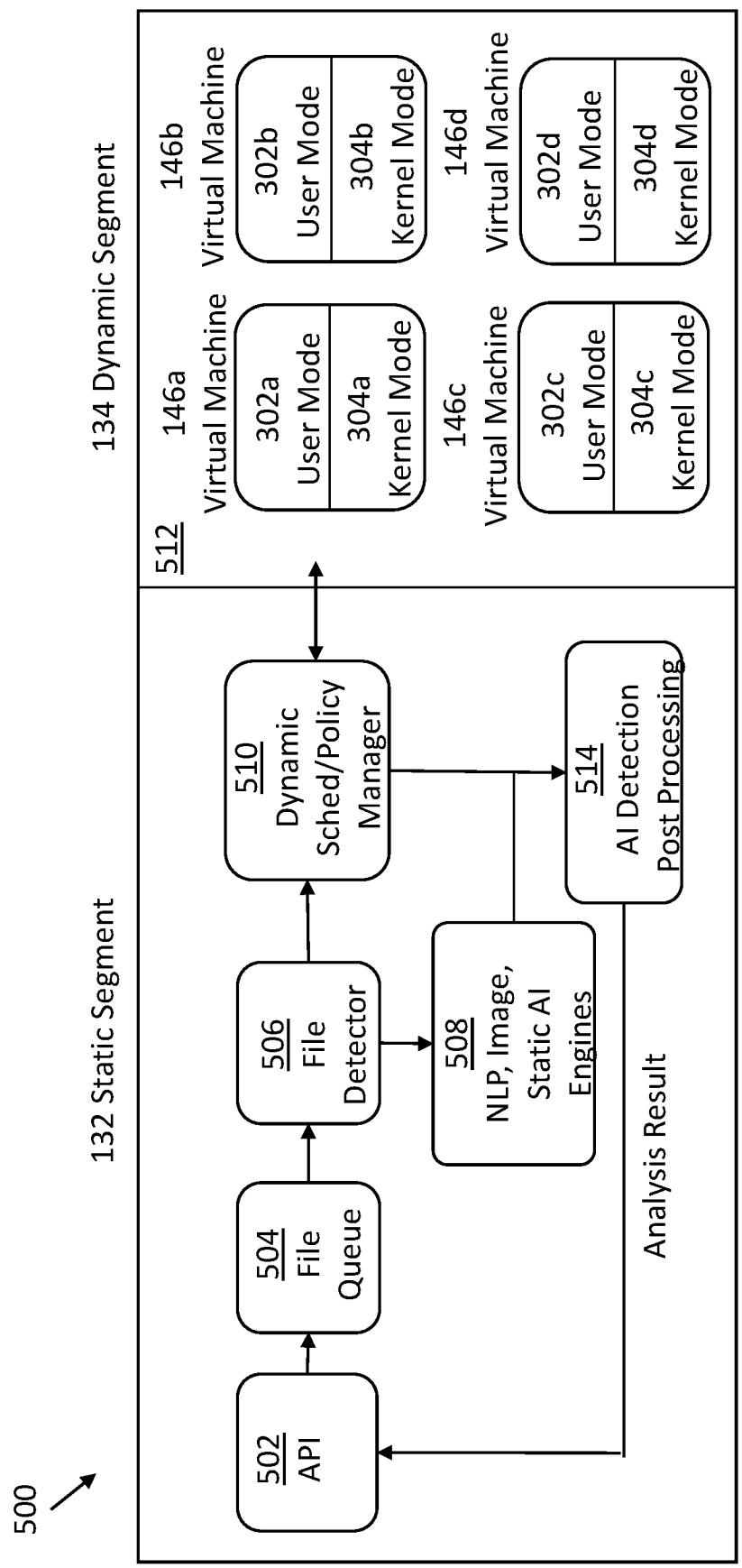
FIG. 5 is a flowchart of a method for analyzing files using a kernel mode of a virtual machine, in accordance with some embodiments.

FIG. 3 is a schematic of a virtual machine 146, in accordance with some embodiments. In the methods and systems disclosed herein, there may be a plurality of virtual machines 146 in the malware sandbox, as shown in FIG. 5. In the dynamic segment 134, the virtual machine 146 may be utilized to evaluate untrusted files before entering the enterprise system. The virtual machine 146 is a safe, secure, isolated environment from the enterprise system, network, and user, where the file can be executed in a dynamic mode as would be in a production mode. The file can be observed in real time and evaluated before entering the enterprise system.

The virtual machine 146 includes a user mode 302 and a kernel mode 304 which are separate from one another by protection rings. In the user mode 302, programs are less privileged and are not allowed to access the system resources directly. For instance, if an application in the user mode 302 tries to access system resources, it will have to first go through the kernel mode by using system calls (see FIG. 4). This prevents applications from altering, and possibly damaging critical operating system data and isolates drivers from the operating system. A user interacts in and with the user mode 302 by, for example, accessing applications 306 such as an email system through a windows API 308 interface. Here, the user may open and send emails. Every activity that occurs in the user mode 302 is translated to actions, and these actions are done in the kernel mode 304. The user mode 302 interacts and communicates with the kernel mode 304 via user mode drivers 310 and kernel mode drivers 312. The operating system kernel 314 facilitates interactions between the hardware 316 via the hardware abstraction layer 318. The file system driver 320 may coordinate system calls (see FIG. 4). The kernel mode 304 is where the core program on which all the other operating system components rely. It is used to access the hardware components and schedule which processes should run and when, and it also manages the application software and hardware interaction. The kernel mode 304 is the most privileged program, and unlike other programs it can directly interact with the hardware. The user does not interact directly with the kernel mode 304.

Figure 4:
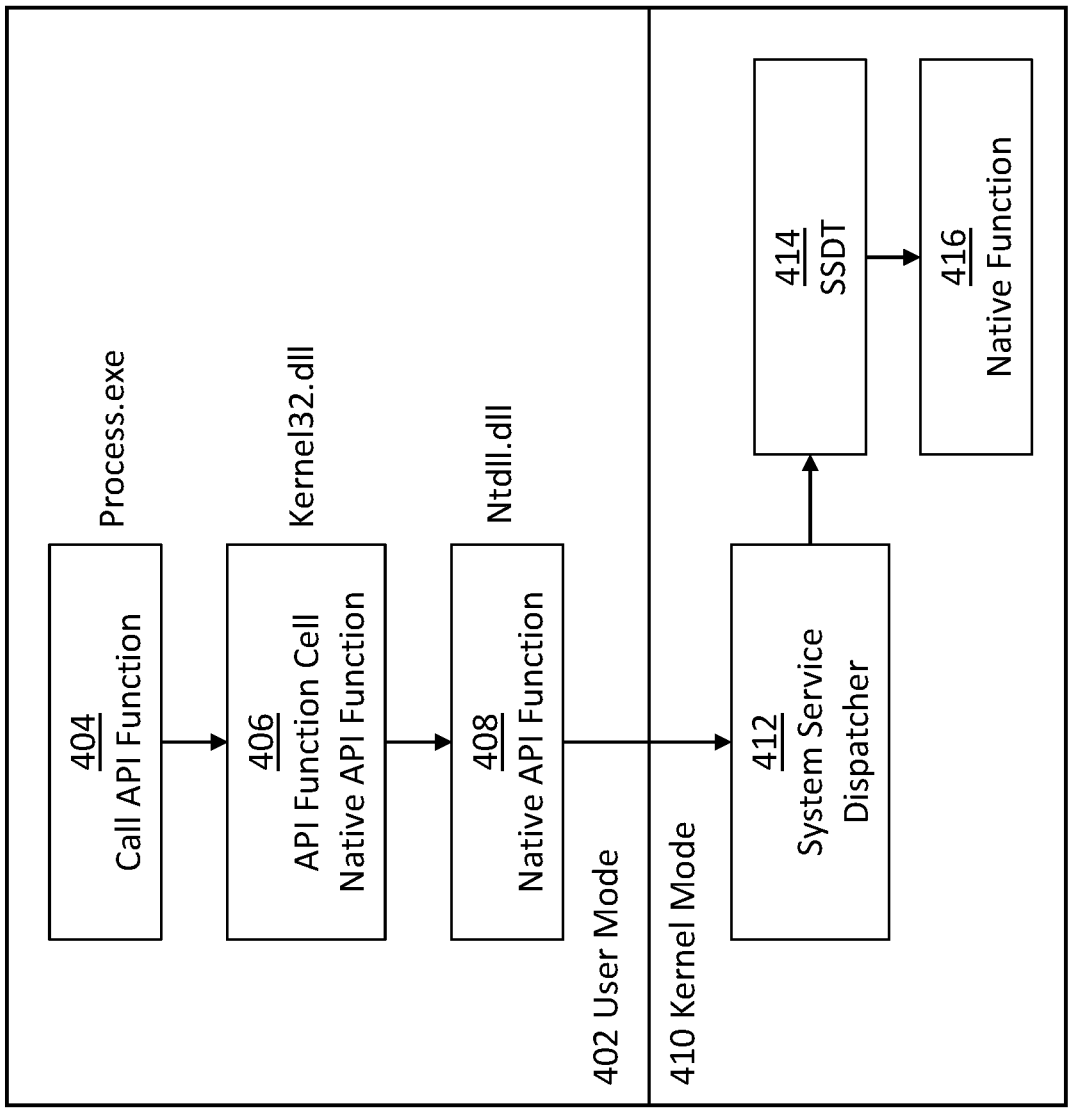
FIG. 4 is a flowchart of a conventional communication protocol between the user mode and the kernel mode for system calls, as known in the art.

FIG. 4 is a flowchart of a conventional communication protocol between the user mode and the kernel-mode for system calls, as known in the art. The conventional communication protocol 400 starts in the user mode 402. This example may apply to Windows. At block 404 in the user mode, a user-mode application attempts a system call (e.g., syscall) such as a file operation, e.g., process.exe. The user fills in the parameters of the API function, which are passed to block 406, the kernel32.dll, for validation and fit to the actual syscall. At block 408, the kernel32.dll calls the corresponding function from the ntdll.dll, which invokes an interrupt with the index of the syscall requested. After the interrupt, at block 412, the syscall enters the kernel mode 410, and is dispatched to block 414. A table, (e.g., SSDT SQL Service Data Tools), resolves the syscall index and the native function address and the flow ends at block 416.

In contrast, in the present embodiments, the system calls are monitored in the kernel mode 304 instead of the user mode 302. The system call may be modified and adapted to deceive malware, so the malware doesn't recognize being in a virtual machine and instead thinks it is functioning in a full operating system with many resources. Traditionally, malware tries to detect virtual machines and may debug monitoring attempts. Additionally, for the example in FIG. 4, in the present embodiments, the driver 604 in kernel mode 304 (see FIG. 6) uses a table with an address change for several APIs enabling them to function on their own, which logs and may alter the syscall response.

FIG. 5 is a flowchart of the method for analyzing files using a kernel mode of a virtual machine, in accordance with some embodiments. The method 500 for analyzing files using a kernel mode of a virtual machine, begins at block 502 with the Application Programing Interface (API) in the static segment 132 of analysis. The API request includes the file, what type of virtual machine or machines to the file may run in, different configuration and setups such as the maximum run time duration, and whether it is suitable to use kernel mode only detection or hybrid detection such as kernel mode and post analysis. At block 504, the file is received from network traffic and queued. At block 506, data is detected from the file such as the type of file and where the file is heading, or which enterprise system or network the file is trying to enter. At block 508, the file may undergo a static analysis engine such as by an image preview AI engine, Optical Character Recognition (OCR) text analysis engine, and static AI engine module 140 (see FIG. 2). The analysis may include signature matching, heuristics, protocol semantics anomalies checking, determinative rule-based analysis, blacklist and whitelist checking, Deep Learning engines, or the like. In some embodiments, the static segment 132 may determine whether the file is deemed suspect.

At block 510, the dynamic schedule policy manager 142 (see FIG. 2) assigns the file to a virtual machine of a plurality of virtual machines 146 for analysis in the dynamic segment 134. At block 512, dynamic analysis is performed with the file in a virtual machine 146. Each virtual machine may be referred to as 146a, 146b, 146c . . . 146n representing any number of virtual machines 146. As described herein, each virtual machine 146 has a user mode 302 and a kernel mode 304. Each user mode may be referred to as 302a, 302b, 302c . . . 302n representing any number of user modes 302. Likewise, each kernel mode may be referred to as 304a, 304b, 304c . . . 304n representing any number of kernel modes. The number of virtual machines 146 is the same as the number of user modes 302 and the number of kernel modes 304.

During the dynamic segment 134 analysis, the file is executed in the user mode 302. In the kernel mode 304, the file is tracked and monitored, and a policy per the organization is applied. In the kernel mode 304, it is determined if the file is allowed to pass to the enterprise system 106 or if the file is denied entry to the enterprise system 106 based on the policy customized by the organization. The result of the dynamic segment 134 analysis is received at 510 by the dynamic schedule and policy manager 142. The detection, such as tracking and monitoring the file, is done only in the kernel mode 304 as opposed to the user mode 302, as known in the art. This saves time, resources and cost as described herein.

At block 514, the file and results may enter AI detection and post processing. In some embodiments, AI may be used when kernel mode detection is not performed. In some embodiments, AI may be used after analyzing the file in the kernel mode as an additional analysis. In this scenario, data may be transferred data from the kernel mode to user mode.

In some embodiments, post processing operations may collect and organize information originating from the file and resulting events and generate a forensic report. The forensic report may be stored and accessed by the computerized system 110. The forensic report can describe and show in detail what happened in the virtual machine, and in the case of detected malware, where the infection came from, and which portions of the virtual machine were infected. In other embodiments, the forensic report may include a summary of the detected malware, threats, and infections. In some embodiments, the full scope of the detections that could have occurred in the enterprise system 106 may be reviewed by personnel. In some embodiments, alarms or messages regarding the file and results may be generated. This information may be passed to the API (block 502).

Figure 6:
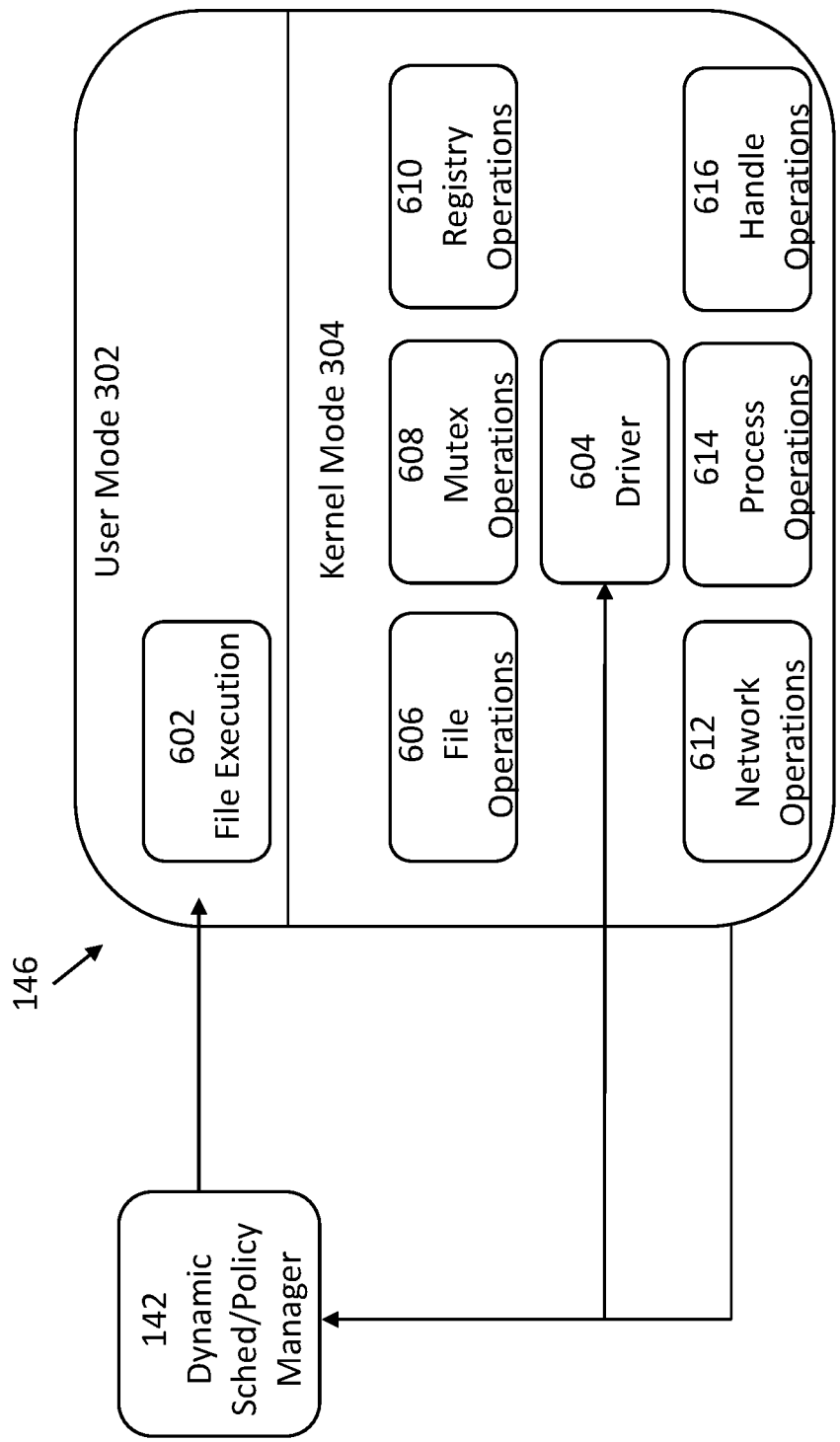
FIG. 6 is a schematic of the virtual machine, in accordance with some embodiments.

FIG. 6 is a schematic of the virtual machine, in accordance with some embodiments. As described herein, the virtual machine 146 includes the user mode 302 and the kernel mode 304. The dynamic schedule and policy manager 142 transmits the file to the virtual machine 146. The file enters the user mode 302 and undergoes file execution 602. A driver 604 (or kernel mode driver 312 in FIG. 3) is integrated in the kernel mode 304 and monitors different operations in the kernel mode 304. For example, the driver 604 in the kernel mode 304 monitors at least one of file operations 606, mutex operations 608, registry operations 610, network operations 612, process operations 614, and handle operations 616 for the resulting events while the untrusted file is executing. The kernel mode 304 enables communication with the driver 604 based on defined APIs which the driver 604 is integrated within. While in the virtual machine 146, in some embodiments, the driver 604 bypasses the protection system of the operating system of the kernel mode 304 to allow the monitoring and tracking of events in the kernel mode 304.

The operations 606-616 may be related to the resulting events of the file in the operating system when executed. The behavior of the file may be legitimate activity or malicious activity. The events of the file may create files, delete files, create persistency by adding itself to the registry, execute another file or create a scheduled task. For example, if the original file creates a new icon in the system, it may create a second file in a specific location. In another example, the file may create a scheduled task such as waking malware. The driver 604 tracks and monitors all the operations 606-616 associated with executing the file including tracking and monitoring any newly created file or events based on the original file.

The policy may allow or deny the file from passing to the enterprise system 106. The policy may define regular, normal, allowed activity, and whom the file may communicate with when using services, processes, pipes, messages or any form of network communication. In some embodiments, any form of interaction between other process, networks or other forms of communications may be disallowed by the policy. The file may have nonauthorized ways to gain persistency in the enterprise system 106 so registry writings, runtime/startup event scheduling or any form of automation that can achieve persistency that is not authorized by the network administrators may be disallowed.

The resulting activity of the file may be a malicious and denied entry to the enterprise system 106. In some embodiments, the resulting activity of the file is a legitimate activity and not malicious. For example, if the file is a Word document, the policy may disapprove—deny entry into the enterprise system 106—if the file opens another Word document using a legitimate service in the operating system. This is based on the policy and ultimately, what behaviors the organization chooses to allow for each file type. Once the activity in the kernel mode 304 does not match or violates the zero-trust policy of the specific policy of the organization, the execution of the file is terminated, and an indication is transmitted to the dynamic schedule and policy manager 142. Different organizations have different security concerns so there are different policies to enforce based on the organizations. In some embodiments, as soon as a malicious or unallowed activity is determined, the execution of the file is terminated thus saving time for large scale deployments.

In one non-limiting example, referring to FIGS. 5 and 6, a file retrieved from the network traffic undergoes blocks 502 through 508. It is detected that the file is a Word document, and the file is bound for the enterprise system of organization A. At block 510, the dynamic schedule and policy manager 142 assigns the file to a virtual machine 146a. The file enters the virtual machine 146a in the user mode 302a and the file is executed in the user mode 302a. The driver 604 of the kernel mode 304a then tracks and monitors all the activity of the file. For example, if the file opens a command line to download malware, the driver 604 tracks this and continues to monitor and track all the activity associated with the file. Simultaneously, lots of other activities are occurring in the operating system but the kernel mode 304a monitors only the current file executing. In some embodiments, a plurality of files is executed in a plurality of virtual machine 146 at the same time.

The driver 604 tracks processors, file creations, file deletions, and other activity such as operations 606-616 as disclosed herein. The policy is applied to the resulting events of the file and according to the policy, it is determined what events of the file are permitted and not permitted. Based on the policy—permitted activity per the organization—the file is allowed into the enterprise system. In some embodiments, the file may be denied from entering the enterprise system for being malicious or performing unallowed actions. In some embodiments, the file may be denied from entering the enterprise system for having a risk of being problematic, suspicious, or dangerous, but not malicious. In some embodiments, the file may be denied from entering the enterprise system based on the policy of the organization. In some embodiments, the file may be denied from entering the enterprise system based on the forensic report such that the malware, threat, or infection is known to the computerized system 110 and has already been detected and documented. After the computerized system 110 uses the virtual machine 146, the virtual machine 146 is no longer clean, and the computerized system 110 restores the virtual machine 146 to a clean state.

Figure 7:
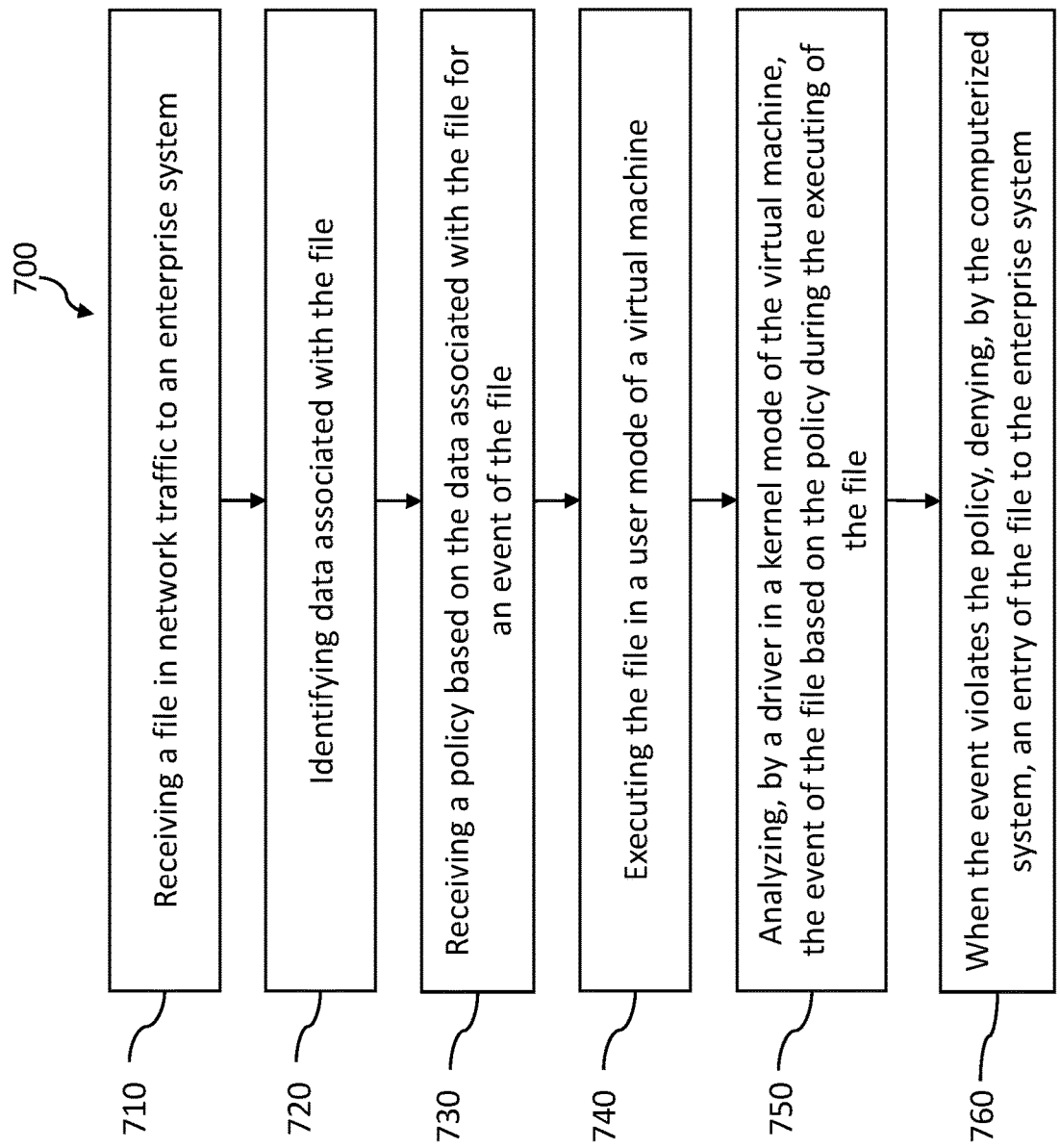
FIG. 7 is a flowchart of a method for analyzing files using a kernel mode of a virtual machine, in accordance with some embodiments.

FIG. 7 is a flowchart of a method for analyzing files using a kernel mode of a virtual machine, in accordance with some embodiments. In a method 700 for analyzing files using a kernel mode of a virtual machine, at block 710, the computerized system 110 receives a file in network traffic to an enterprise system 106. In some embodiments, the computerized system 110 connects to a network traffic device 102 outside of the enterprise system 106. In some embodiments, the computerized system 110 connects to a network traffic device 102 within of the enterprise system 106.

At block 720, the computerized system 110 identifies data associated with the file. In some embodiments, the data associated with the file includes a file type such as Word, PDF, JPEG, Excel, or the like. In some embodiments, the data associated with the file includes a target destination. This may be the organization or enterprise system the file is trying to enter. At block 730, the computerized system 110 receives a policy based on the data associated with the file for an event or activity of the file. In some embodiments, the policy may be based on a target destination. In some embodiments, the policy is based on malicious activity of the file. In some embodiments, the policy is based on an operation that can be performed by the file. Put another way, the policy is based on the behavior of the file without regard to maliciousness.

At block 740, the computerized system 110 executes the file in a user mode 302 of a virtual machine 146. At block 750, driver 604 in a kernel mode 304 of the virtual machine 146 analyzes the event of the file based on the policy during the executing of the file. The event comprises at least one of file operations 606, mutex operations 608, registry operations 610, network operations 612, process operations 614, and handle operations 616. At block 760, when the event violates the policy, the computerized system 110 denies the entry of the file to the enterprise system 106. When the event is permitted by the policy, the computerized system 110 allows entry of the file to the enterprise system 106. Also, when analyzing the event of the file in the kernel mode 304 during the executing of the file in the user mode 302, the kernel mode 304 is undetectable by the user mode 302. This means that the user and the user mode 302 are not aware of the computerized system 110 operating in the kernel mode 304. The method 700 operates in a stealth, unnoticeable way.

Referring to FIGS. 1, 2, 3 and 6, in some embodiments, a computerized system 110 includes a memory 126 for storing executable instructions and a processor 128. The processor 128 is coupled to the memory 126 that performs a method by executing the instructions stored in the memory 126. The method includes receiving, by the processor 128, a file in network traffic to an enterprise system 106. The processor 128 identifies data associated with the file. The processor 128 receives a policy based on the data associated with the file for an event of the file. The processor 128 executes the file in a user mode 302 of a virtual machine 146 (e.g., 146*a*, 146*b*, 146*c* . . . 146*n*). A driver 312 or 604 in a kernel mode 304 of the virtual machine 146 analyzes the event of the file based on the policy during the executing of the file. When the event violates the policy, the processor 128 denies entry of the file to the enterprise system 106.

Some embodiments involve a non-transitory processor-readable medium embodying program instructions that, when executed by a processor, cause the processor to implement a method. The method may be method 700 such as described in FIG. 7. The method includes receiving a file in network traffic to an enterprise system and identifying data associated with the file. A policy is received based on the data associated with the file for an event of the file. The file is executed in a user mode of a virtual machine. A driver in a kernel mode of the virtual machine analyzes the event of the file based on the policy during the executing of the file. When the event violates the policy, denying entry of the file to the enterprise system.

Figure 8:
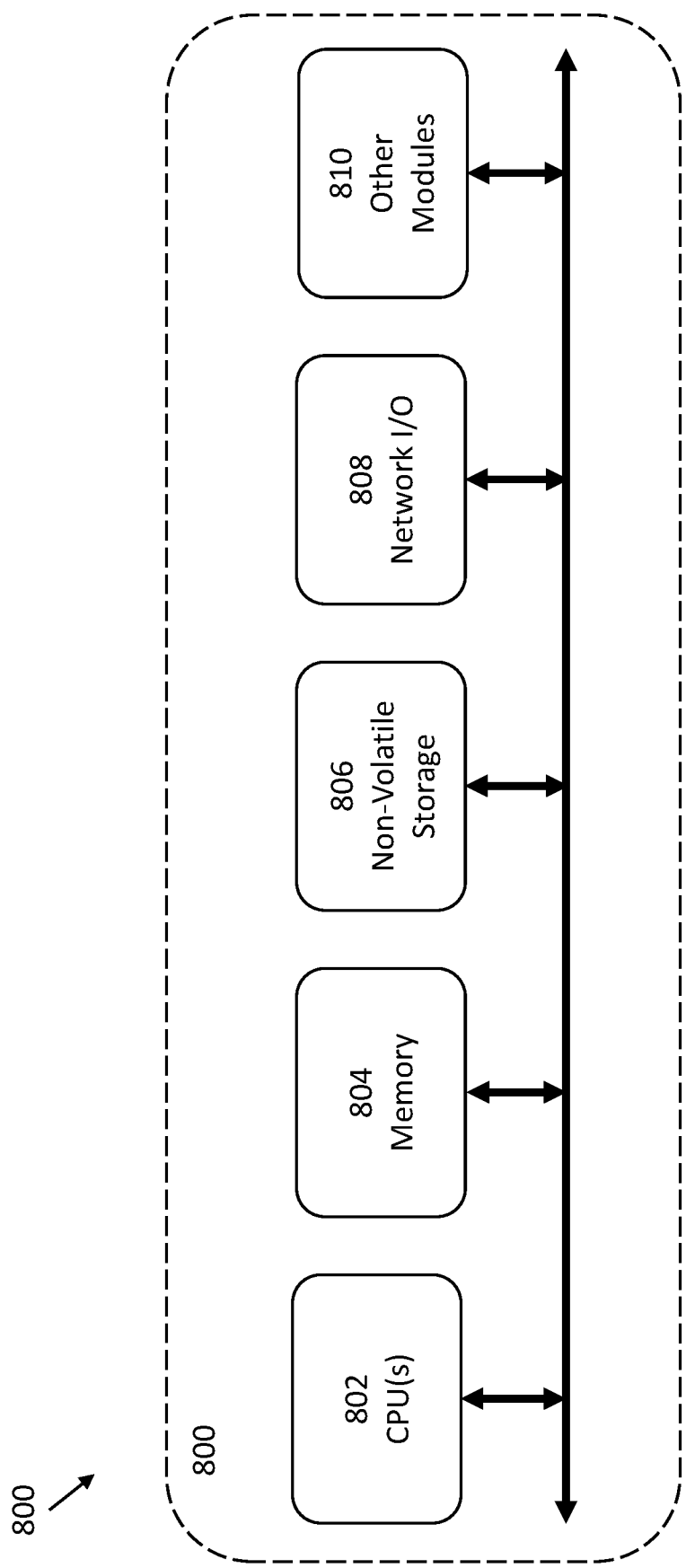
FIG. 8 illustrates an example compute node which could be used as a hardware platform for implementing all or a portion of each of the computerized system and the devices, in accordance with some embodiments.

FIG. 8 illustrates an example compute node 800 which could be used as a hardware platform for implementing all or a portion of each of the computerized system 110 and the devices 102, in accordance with some embodiments. The compute node 800 generally includes one or more CPUs 802, a memory module 804 (e.g., RAM), a non-volatile data storage module 806 (e.g., a hard-drive/disk-drive or array of hard-drives/disk-drives), a network I/O module 808 (e.g., a network interface card (NIC) and/or a top-of-rack interface), and other modules 810 such as user I/O, wireless communication modules, optical communication modules, system diagnostic or monitoring modules, or other modules. The CPUs 802 are operable to perform processes in association with the memory module 804 and the non-volatile data storage module 806. In some embodiments, one or more compute nodes 800 are configured to perform all or a portion of the methods 500 and/or 700 disclosed herein. In such embodiments, the memory module 804 and the non-volatile data storage module 806 may include all, or a portion of the programs and data required by the CPUs 802 to perform the methods 500, and/or 700 disclosed herein.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
   receiving, by a computerized system, a file in network traffic to an enterprise system;
   identifying, by the computerized system, data associated with the file;
   receiving, by the computerized system, a policy based on the data associated with the file for an event of the file;
   executing, by the computerized system, the file in a user mode of a virtual machine;
   analyzing, by a driver in a kernel mode of the virtual machine, the event of the file based on the policy during the executing of the file, wherein the driver monitors and modifies system calls in real-time based on the policy to prevent unauthorized actions before they complete;
   determining, by the driver in the kernel mode, in real-time, when the event violates the policy; and
   when the event violates the policy, denying, by the computerized system, an entry of the file to the enterprise system.

2. The method of claim 1, wherein the data associated with the file includes a file type.

3. The method of claim 1, wherein the data associated with the file includes a target destination.

4. The method of claim 1, further comprising, when the event is permitted by the policy, allowing, by the computerized system, the entry of the file to the enterprise system.

5. The method of claim 1, wherein the event comprises at least one of file operations, mutex operations, registry operations, network operations, process operations, and handle operations.

6. The method of claim 1, wherein the policy is based on a target destination.

7. The method of claim 1, wherein the policy is based on malicious activity of the file.

8. The method of claim 1, wherein the policy is based on an operation that can be performed by the file.

9. The method of claim 1, further comprising:
   connecting, by the computerized system, to a network traffic device outside of the enterprise system.

10. The method of claim 1, wherein during the analyzing of the event of the file in the kernel mode during the executing of the file, the kernel mode is undetectable by the user mode.

11. A computerized system comprising:
    a memory storing executable instructions; and
    a processor, coupled to the memory, that performs a method by executing the instructions stored in the memory, the method comprising:
    receiving, by the processor, a file in network traffic to an enterprise system;
    identifying, by the processor, data associated with the file;

receiving, by the processor, a policy based on the data associated with the file for an event of the file;

executing, by the processor, the file in a user mode of a virtual machine;

analyzing, by a driver in a kernel mode of the virtual machine, the event of the file based on the policy during the executing of the file, wherein the driver monitors and modifies system calls in real-time based on the policy to prevent unauthorized actions before they complete;

determining, by the driver in the kernel mode, in real-time, when the event violates the policy; and when the event violates the policy, denying, by the processor, an entry of the file to the enterprise system.

12. The computerized system of claim 11, wherein when the event is permitted by the policy, allowing the entry of the file to the enterprise system.

13. The computerized system of claim 11, wherein the event comprises at least one of file operations, mutex operations, registry operations, network operations, process operations, and handle operations.

14. The computerized system of claim 11, wherein the policy is based on a target destination.

15. The computerized system of claim 11, wherein the policy is based on malicious activity of the file.

16. The computerized system of claim 11, wherein the processor connects to a network traffic device outside of the enterprise system.

17. The computerized system of claim 11, wherein during the analyzing of the event of the file in the kernel mode during the executing of the file, the kernel mode is undetectable by the user mode.

18. A non-transitory computer-readable media embodying program instructions that, when executed by a processor, cause the processor to implement a method, comprising:

receiving a file in network traffic to an enterprise system;

identifying data associated with the file;

receiving a policy based on the data associated with the file for an event of the file;

executing the file in a user mode of a virtual machine;

analyzing, by a driver in a kernel mode of the virtual machine, the event of the file based on the policy during the executing of the file, wherein the driver monitors and modifies system calls in real-time based on the policy to prevent unauthorized actions before they complete;

determining, by the driver in the kernel mode, in real-time, when the event violates the policy; and when the event violates the policy, denying an entry of the file to the enterprise system.

19. The non-transitory computer-readable media of claim 18, wherein the policy is based on a target destination.

20. The non-transitory computer-readable media of claim 18, wherein the policy is based on malicious activity of the file.

* * * * *